United States Patent
Yasuda et al.

(10) Patent No.: US 6,194,083 B1
(45) Date of Patent: Feb. 27, 2001

(54) CERAMIC COMPOSITE MATERIAL AND ITS MANUFACTURING METHOD, AND HEAT RESISTANT MEMBER USING THEREOF

(75) Inventors: Kazuhiro Yasuda; Seiichi Suenaga, both of Yokohama; Kunihiko Wada, Kawasaki; Hiroki Inagaki, Yokohama; Yasuhiro Goto, Tokyo, all of (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 0 days.

(21) Appl. No.: 09/122,636

(22) Filed: Jul. 27, 1998

(30) Foreign Application Priority Data

Jul. 28, 1997 (JP) .................................................. 9-201922
Mar. 16, 1998 (JP) ................................................. 10-065208
Mar. 17, 1998 (JP) ................................................. 10-067080

(51) Int. Cl.$^7$ .............................. B32B 9/00; B32B 15/00; C04B 35/03; C04B 35/48

(52) U.S. Cl. .......................... 428/615; 428/632; 428/633; 428/678; 428/680; 428/469; 428/472; 428/325; 501/104; 501/108; 501/123

(58) Field of Search .................................... 428/615, 632, 428/633, 678, 680, 681, 937, 469, 472, 701, 702, 325; 106/600; 501/94, 102–104, 106, 108, 123, 133–137

(56) References Cited

U.S. PATENT DOCUMENTS

| | | | | |
|---|---|---|---|---|
| 4,774,209 | * | 9/1988 | Gadkaree et al. | 501/89 |
| 4,919,991 | * | 4/1990 | Gadkaree | 428/113 |
| 4,935,387 | * | 6/1990 | Beall et al. | 501/3 |
| 5,422,319 | * | 6/1995 | Stempin et al. | 501/9 |
| 5,579,534 | * | 11/1996 | Itoh et al. | 428/547 |
| 5,955,182 | * | 9/1999 | Yasuda et al. | 428/217 |

OTHER PUBLICATIONS

C.C. Berndt et al., "The Manufacture and Microstructure of Fiber–Reinforced Thermally Sprayed Coatings", Surface and Coating Technology, 37, pp. 89–110, (1989).

Kh.G. Schmitt–Thomas et al., "New Developments in Thermal Barrier Coatings (TBC) for Gas Turbine Use", Industrial Ceramics, vol. 16, N. 3, pp. 195–198, (1996).

Fuji, Hirano et al., Proceedings of Japan Ceramic Society Annual Meeting, 2C–02, 1993, Formation Behavior of La–β–Aluminate in the Zirconia, pp. 367–368, (no month).

* cited by examiner

Primary Examiner—Timothy M. Speer
Assistant Examiner—Bryant Young
(74) Attorney, Agent, or Firm—Finnegan, Henderson, Farabow, Garrett & Dunner, L.L.P.

(57) ABSTRACT

A ceramic composite material comprises a ceramic material constituting a matrix, and dispersion particles disposed in the matrix in a dispersing manner. A specific shape of a ceramic composite material is, for instance, a sinter or a thermally sprayed layer. The dispersion particles are consisting of a composite oxide including at least one kind of a first metallic element selected from alkaline earth metals such as Mg and Ca, and at least one kind of a second metallic element selected from W, Ti, Ta, Mo, Nb, V, B, Te, Ge and Si, for instance, are composite oxide particles precipitated by reacting a compound containing a first metallic element and a compound including a second metallic element through heat treatment. The precipitated particles consisting of such a composite oxide can be dispersed as planar particles or acicular particles in the ceramic layer to which, for instance, thermal spraying is applied. The dispersion particles suppress deterioration of strength or toughness of the oxide based ceramic material under high temperature atmosphere.

18 Claims, 3 Drawing Sheets

CERAMIC COMPOSITE MATERIAL AND ITS MANUFACTURING METHOD, AND HEAT RESISTANT MEMBER USING THEREOF

BACKGROUND OF THE INVENTION

1. Field of the Invention

The present invention relates to a ceramic composite material having such as, for instance, an oxide based ceramic material as a matrix and its manufacturing method, and a heat resistant member using thereof.

2. Description of the Related Art

An oxide based ceramic material such as zirconia and alumina, because of their characteristics such as high melting point, high strength, high toughness, is being used as a high temperature structure material and the like. In particular, for a heat shielding coating of a high temperature equipment represented by a furnace wall, a fire brick, a gas turbine, zirconia is being frequently used. Zirconia can be also used for an electrolyte material of a fuel battery.

For a rotor/stator blade of a gas turbine for electricity generation or an engine, a technology applying, on the surface of a Ni based or Co based superalloy of high strength, a coating of a corrosion resistant/oxidation resistant metal consisting of a M—Cr—Al—Y (M=Ni, Co and the like) alloy is widely employed. However, since the metal coating only is becoming insufficient as material characteristics, a heat shielding coating technology coating a ceramic low in its thermal conductivity further on the metal coating is being put in use. For a constituent material of such a heat sealing coating, $Y_2O_3$ stabilized zirconia is widely being used.

In stabilized zirconia, it is known that a stress induced phase transition from a tetragonal phase to a monoclinic phase occurs at a crack end portion, thereby high strength and high toughness can be obtained. However, when used under a high temperature environment such as at 673 K or above, particularly at a temperature exceeding 1273 K, since the tetragonal zirconia becomes a stable region, the phase transistion from the tetragonal to monoclinic phase does not occur at the crack end. As a result, the values of strength and toughness is known to deteriorate. In the case of the alumina also, under a high temperature environment of 1273 K or more, the strength is seen to be degraded. From these, it is desired that, through suppression of the development of the crack under high temperature, the strength and the toughness of the oxide based ceramic material such as zirconia and alumina is further heightened under high temperature.

As a high temperature structure material other than the oxide based one, a non-oxide based ceramic material represented by such as silicon nitride, silicon carbide, sialon is known. However, since the high temperature atmosphere which is being generally used is in many cases an air atmosphere, that is, an oxidizing atmosphere, an oxidizing reaction is inevitable for the non-oxide based ceramic materials. Therefore, the change with the passage of time due to attrition of the high temperature member, due to crack occurrence at the surface portion can occur, thereby the values of the strength and the toughness tend to be degraded.

On the contrary, when a member to which a heat shielding coating is applied on the surface of the metal member is used under a high temperature atmosphere, the thermal stress occurs due to difference of the thermal expansion coefficients of the metal member and the heat shielding coating (ceramic layer), the ceramic layer is likely to be peeled off. In particular, a crack develops at the neighboring area of the interface between the metal member and the ceramic layer, the ceramic layer peels off. If the ceramic layer is peeled off, the member to which the heat shielding coating is applied is prevented from being used over a long term. Therefore, even when such as zirconia is used as the heat shielding coating, the development of the crack is desired to be suppressed under a high temperature.

As a generally used means suppressing the crack development in a ceramic member, it is known to make composite the inner texture by dispersing whisker, fiber in the ceramic material to make increase the breaking strength and the fracture toughness. For instance, as an example in which the fracture strength value, a criterion of suppression of the crack development, is heightened, a sinter in which SiC fibers or carbon fibers are dispersed in a non-oxide based ceramic material such as SiC or $Si_3N_4$, or a member in which a $\beta$-$Si_3N_4$ possessing an acicular texture is precipitated in the $Si_3N_4$ matrix in the course of firing is reported. However, when the matrix is a non-oxide based ceramic material, because of incapability of suppression of deterioration due to oxidation, it can not endure a long term use. Further, when the fibrous substance is being dispersed, its dispersion state causes a trouble of being likely to be inhomogeneous.

In a member wherein a Ce stabilized zirconia is used as a matrix, by precipitating planar particles consisting of La-$\beta$-$Al_2O_3$ in the course of firing, an enhancement effect (crack development suppression effect) of the fracture toughness is reported to be obtained (Fujii, Hirano, et al.: Proceeding of Japan Ceramic Society Annual Meeting, 2C-02, 1993 and others). However, in order to disperse the La-$\beta$-$Al_2O_3$ particles in a matrix consisting of a stabilized zirconia, a heat treatment at such a high temperature as 1873 K is necessary. Since this heat treatment temperature is higher than the sintering temperature (1673 to 1773 K) of zirconia, particle growth of the zirconia member is enhanced to invite degradation of the strength.

Also as to a ceramic layer to be used for a heat shielding coating of such as a vane member of an electric generating plant or a gas turbine, a combustor, in order to enhance peeling life, making composite the inside texture has been investigated. As one of them, with an object to enhance the peeling life of the heat shielding coating, dispersion of particles (spheroidal, clustered, planar, fibrous particles) therein has been tried (for instance, Surf. And Coat. Tech., C. C. Berndt and J. H. YI, 37(1989), p89–110).

However, since the heat shielding coating is mainly implemented by thermal spraying which is specific and different from the firing process, that is, the covering layer is formed by colliding melted particles to a substrate with high speed to solidify, when reinforcement fibers or reinforcement particles are mixed in advance, the reinforcement substance is melted in the course of the thermal spraying, resulting in incapability of obtaining a dispersed and reinforced ceramic layer.

That is, in the thermal spraying, through collision/solidification of the molten particles, flat particles are stacked to form a covering layer of a film thickness of about 200 to 500 $\mu$m. Therefore, even when, with an intention to disperse these fibrous, acicular, planar particles, the thermal spraying is carried out with a mixed powder between these particles and the matrix constituent particles, since they are melted in the plasma flame, the particles of targeted shape such as the fibrous particles can not be dispersed in the ceramic layer. Thus, direct dispersion of the fibrous particles (such as alumina fibers) other than the flat particles (spray solidifying particles) has been much tried with the thermal spraying without success to the present days.

The method of forming a dispersed phase consisting of planar particles (such as La-$\beta$-$Al_2O_3$ particles) with an indirect method such as the previously mentioned heat treatment, because of necessity of the high temperature treatment, in the heat resistant member which is a composite member with a metal member, adversely affect on its metal member. Because of such a restriction, no example is known in which the inside texture is made composite by implementing heat treatment to the ceramic layer which is a heat shielding coating.

From these, it is strongly desired to develop a ceramic composite material which does not invite deterioration with the passage of time when used under a high temperature in the air and which can be expected to give the high strength and the high toughness. In particular, it is desired that, when applied to the heat shielding coating, through suppression of the development of the crack caused based on the difference of the thermal expansion between the metal member and the ceramic layer, the peeling life of the ceramic layer is to be enhanced.

SUMMARY OF THE INVENTION

Thus, an object of the present invention is, through suppression of the development of the crack in the inside of such as an oxide based ceramic material under a high temperature atmosphere, to provide a ceramic composite material improved in its strength and toughness particularly under high temperature, and a producing method thereof. Further, the other object of the present invention is, through suppression of peeling of the ceramic layer under high temperature atmosphere over a long term, to provide a heat resistant member which achieved a long life.

A ceramic composite material of the present invention is characterized in comprising a ceramic material constituting a matrix and dispersion particles which are disposed in a dispersing manner in the matrix and is consisting of a composite oxide including at least one kind of a first metallic element selected from alkaline earth metals and at least one kind of a second metallic element selected from W, Ti, Ta, Mo, Nb, V, B, Te, Ge and Si. As a specific example of a ceramic composite material of the present invention, a ceramic composite sinter and a ceramic layer due to the thermal spraying can be cited.

A producing method of a ceramic composite material of the present invention is characterized in comprising a step of forming a powder mixture containing a ceramic material constituting a matrix, and at least one kind of a first metallic element selected from the alkaline earth metals, and at least one kind of a second metallic element selected from W, Ti, Ta, Mo, Nb, V, B, Te, Ge and Si, and a step of precipitating in the ceramic material the particles consisting of the composite oxide including the first metallic element and the second metallic element by implementing heat treatment upon the formed body obtained at the forming step at a temperature in the range of 773 to 673 K.

A heat resistant member of the present invention comprises a metal basis consisting of an alloy of which main component is at least one kind of element selected from Ni, Co and Fe, and a ceramic layer formed covering directly or through a metal bonding layer on the metal basis, wherein, the ceramic layer comprises a ceramic material constituting the matrix and the dispersion particles which is disposed in a dispersing manner in the matrix and is consisting of a composite oxide including at least one kind element selected from the alkaline earth metals.

In a ceramic composite material of the present invention, particles consisting of a composite oxide including at least one kind of a first metallic element selected from the alkaline earth metals such as Mg, Ca, and at least one kind of a second metallic element selected from W, Ti, Ta, Mo, Nb, V, B, Te, Ge and Si, are disposed in a dispersing manner in a ceramic material constituting a matrix. Since the particles consisting of the composite oxide possess an effect suppressing development of the crack inside the matrix, the strength and the toughness of, for instance, the oxide based ceramic material constituting the matrix is remarkably improved under high temperature atmosphere. When the present invention is applied to a ceramic layer as, for instance, a heat shielding coating, the peeling of the ceramic layer based on the thermal stress can be suppressed with stability.

Now, a compound containing a first metallic element selected from the alkaline earth metals, and a compound containing a second metallic element react at a relatively low temperature such as 773 to 1673 K to form composite oxides such as $MgWO_4$, $MgTi_2O_5$, $CaWO_4$, $CaTiO_3$. Further, by selecting the heat treatment condition, the planar particles and the acicular particles consisting of these composite oxides can be precipitated.

The planar particles and the acicular particles consisting of such a composite oxide, not only having suppression effect of the development of the crack inside the matrix, but also, since being able to be formed below the sintering temperature, for instance, in the course of firing, do not invite deterioration of the strength through enhancement of particle growth of the matrix like in the case of the conventional La-$\beta$-$Al_2O_3$.

Further, since, after formation of a ceramic layer through application of a coating method in which the initial particle shape is lost such as in the case of the thermal spraying, the planar particles and the acicular particles can be precipitated through application of the heat treatment, the particles possessing an effect suppressing the development of the crack can be dispersed with reproducibility in the ceramic layer. The heat treatment temperature precipitating the dispersion particles, being relatively low as mentioned above, does not adversely affect on a metal basis of a heat resistant member.

The dispersion particles, being formed through the heat treatment, can be disposed homogeneously and without being oriented in the matrix. Therefore, the strength and the toughness value of the matrix consisting of the ceramic material can be heightened uniformly with stability. In addition, since the dispersion particles formed through the heat treatment is high in its coherency with the matrix, the strength deterioration of the matrix is not induced.

DESCRIPTION OF THE PREFERRED EMBODIMENTS

In the following, embodiments carrying out the present invention will be described with reference to the drawings.

Figure 1:
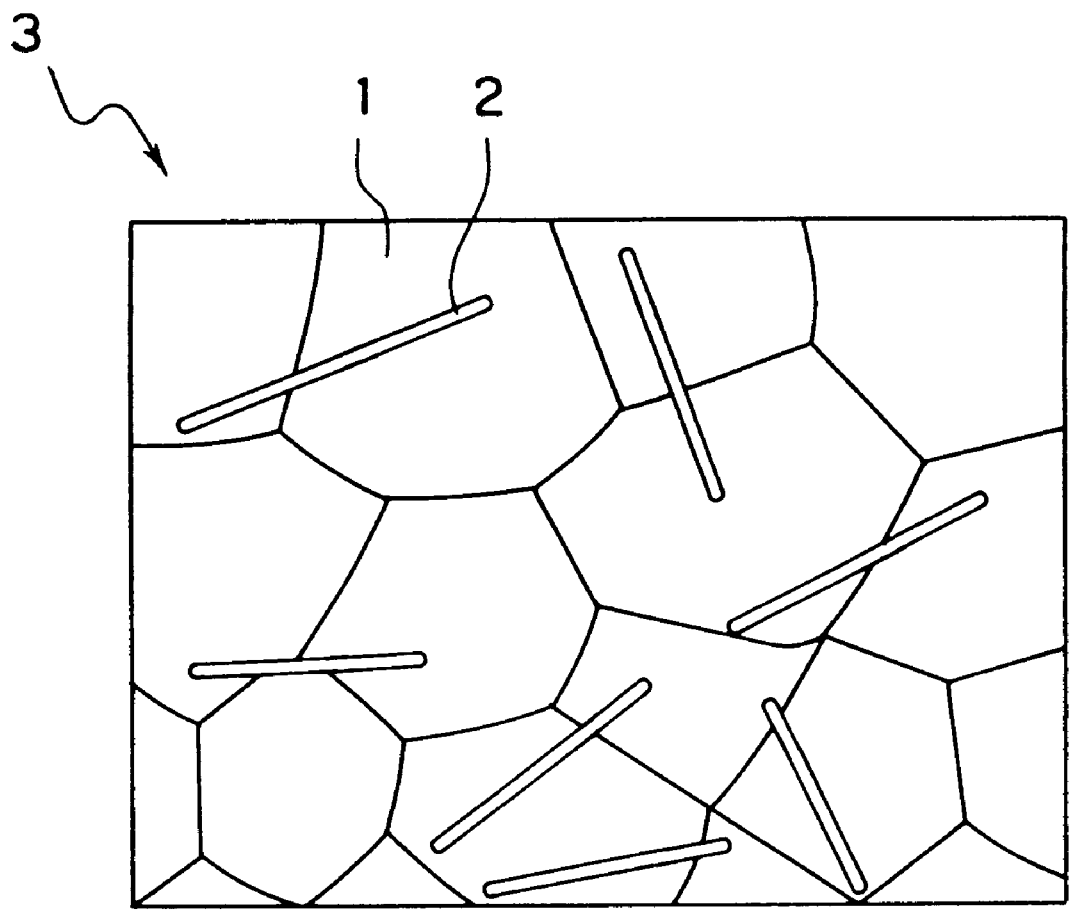
FIG. 1 is a diagram schematically showing a microstructure texture of one embodiment to which a ceramic composite of the present invention is applied.

First, an embodiment in which a ceramic composite material of the present invention is applied to a ceramic composite sinter will be described. FIG. 1 is a diagram schematically showing a microstructure texture of one embodiment of a ceramic composite member (composite sinter) to which the present invention is applied.

In the figure, reference numeral 1 denotes a matrix consisting of an oxide based ceramic material. As an oxide based ceramic material constituting the matrix 1, zirconia, alumina, magnesia, yttria can be cited. In particular, a stabilized zirconia excellent in its strength and toughness can be said to be a preferable material. As a specific example of a stabilized zirconia, a partially stabilized zirconia and a stabilized zirconia mainly constituted of a tetragonal or a cubic crystal system can be cited In a partially stabilized zirconia and a stabilized zirconia, a rare earth oxide such as yttria or an alkaline earth oxide such as magnesia, calcia can be used as a stabilizer. An addition quantity of a stabilizer is preferable the solubility of the rare earth element such as Y or the alkaline earth element such as Mg, Ca to be set in the range of 2 to 20 mol %.

Among them, in order to obtain mainly a tetragonal zirconia, inclusion of a rare earth element in the range of 2 to 10 mol % is preferable. Further, in order to obtain mainly a cubic zirconia, inclusion of a rare earth element in the range of 10 to 20 mol % or of an alkaline earth element in the range of 2 to 20 mol % is preferable. In particular, a system which is mainly constituted of a tetragonal zirconia and in which yttria is added by about 2 to 5 mol % as its Y solubility is most suitable as a matrix 1 since a zirconia member of high strength/high toughness can be obtained.

Incidentally, depending on use of a ceramic composite member 3, the matrix 1 can be constituted of a non-oxide based ceramic material such as a nitride based ceramic and a carbide based ceramic.

Within the above described matrix 1, dispersion particles 2 consisting of a composite oxide including at least one kind of a first metal selected from the alkaline earth metals such as Mg, Ca, Sr, Ba and at least one kind of a second metal selected from W, Ti, Ta, Mo, Nb, V, B, Te, Ge and Si are disposed in a dispersing manner. Of these matrix 1 and the dispersion particles 2, a ceramic composite member 3 is constituted. The dispersion particles 2 consisting of the composite oxide are particles precipitated due to the reaction product between the first metallic element and the second metallic element.

For instance, in an oxide based ceramic material constituting a matrix 1, an alkaline earth oxide (a compound containing the first metal) represented by MgO and CaO, and ;an oxide containing at least one kind of the second metal selected from W, Ti, Ta, Mo, Nb, V, B, Te, Ge and Si are mixed to form a desired shape. On carrying out the heat treatment on the formed body, the above described respective compounds react mutually at a relatively low temperature such as 773 to 1673 K to produce a composite oxide including the first metal and the second metal. Further, by selection of the heat treatment condition, sintering occurs between the composite oxide particles, thereby growing into the planar particles and the acicular particles to precipitate.

The composite oxide particles (2) consisting of such planar particles or acicular particles are incorporated inside the crystal grains or at the grain boundary of the oxide based ceramic constituting the matrix 1 thereafter in the course of firing.

Thus, the dispersion particles 2 consisting of the planar particles or the acicular particles, or the coagulated particles thereof can be precipitated in the oxide based ceramic constituting the matrix 1. The dispersion particles 2 consisting of the composite oxide particles precipitated due to the heat treatment can suppress the growth of the crack developing within the matrix 1. The composite oxide particles function favorably as the so-called dispersion particles 2.

The composite oxide particle as dispersion particles 2 need only include at least one kind of a first metallic element selected from the alkaline earth metals such as Mg, Ca, Sr, Ba, and at least one kind of a second metallic element selected from W, Ti, Ta, Mo, Nb, V, B, Te, Ge, and Si, the elements other than these can be further included. The resulting composite oxides differ according to the kinds of the first and the second metallic elements and composition thereof. The second metallic element is, in particular, preferable to be at least one kind of element selected from W, Ti, Ta, Mo and Nb.

When Mg is used as an alkaline earth metal, as the composite oxides, $MgWO_3$, $MgTiO_3$, $MgTi_2O_5$, $Mg_2TiO_4$, $MgTa_2O_6$, $Mg_4Ta_2O_9$, $MgMoO_4$, $Mg_2Mo_3O_{11}$, $MgNb_2O_6$, $Mg_4Nb_2O_9$, $MgB_4O_7$, $MgGeO_3$, $MgTe_2O_5$, $Mg_3V_4O_{13}$, $MgSiO_3$ can be cited. When Ca is used as an alkaline earth metal, $CaWO_4$, $Ca_3WO_6$, $CaTiO_3$, $Ca_3Ti_2O_7$, $CaTa_2O_6$, $CaTa_4O_{11}$, $Ca_2Ta_2O_7$, $CaMoO_4$, $CaNb_2O_6$, $Ca_4Nb_2O_9$ can be cited. When Mg and Ca are concurrently used as the alkaline earth metal, mixture of the above described composite oxide including Mg and composite oxide including Ca, the composite oxide including Mg and Ca simultaneously, or mixture thereof can be cited. Incidentally, even when Sr and Ba are used as the alkaline earth metal, similar composite oxides can be produced.

When the ceramic composite member 3 is used under a high temperature atmosphere such as 1473 K or more for a long time, the dispersion particles 2 consisting of, in particular, $MgWO_3$, $MgMoO_4$, $Mg_2TiO_4$, $MgTiO_3$, $MgTi_2O_5$, $MgTa_2O_6$, $Mg_4Ta_2O_9$, $MgNb_2O_6$, $Mg_4Nb_2O_9$, and similar composite oxides including Ca, or mixture thereof are preferable to be employed among the above described composite oxides. Since such composite oxides can be high melting points and the change such as deformation due to the precipitated particles (dispersion particles 2), decomposition during high temperature use, the suppression effect of the development of the crack due to the dispersion particles 2 can be obtained with more stability.

Further, the composite oxide particles including Ca among the above described composite oxides have a tendency to be likely to form a reaction phase at the interface with the matrix 1 consisting of a stabilized zirconia and the like. Therefore, when the crack developed, peeling at the interface between the matrix 1 and the dispersion particles 2 can be suppressed. Thereby, the effect suppressing the development of the crack can be heightened.

The precipitation shape of the composite oxides to be the dispersion particles 2 is preferable to be a planar particle or an acicular texture. By precipitating the particles of such shape in the matrix 1, the effect excellent in suppressing the development of the crack can be obtained. The planar particle mentioned here is about 1 to 40 μm in its major axis, about 0.1 to 5 μm in its thickness, about 1 to 20 in its aspect ratio.

The dispersion particles 2 are not restricted to a planar particle, but an acicular particle, for instance, of large in its aspect ratio, thick in its thickness can be accepted. The dispersion particles 2 can include both the planar particles and the acicular particles. Further, the dispersion particles 2 can be coagulated particles of the planar particles and the acicular particles. The coagulated particles have a structure in which the composite oxide particles of the planar shape or the acicular shape are entangled through interconnection. The coagulated diameter is not particularly restricted, but the range of 10 to 100 μm is preferable. By employing the particles having such coagulated diameter, without deteriorating the combining strength of the matrix 1, the effect excellent in suppression of the development of the crack can be obtained. The diameter of the coagulated particles roughly depends on the particle diameter of the raw material powder of the dispersion particle 2.

The dispersion particles 2 consisting of the composite oxide are preferable to be disposed in a dispersing manner in the range of 1 to 50% by weight to the matrix 1. When the amount of the dispersion particles 2 is less than 1% by weight to the matrix 1, the suppression effect sufficient to suppress the development of the crack is threatened to be obtained. On the contrary, when the amount of the dispersion particles 2 exceeds 50% by weight, the characteristics inherent to the oxide based ceramic material as the matrix 1 is threatened to be damaged. The amount of the dispersion particles 2 is preferable to be in the range of 5 to 40% by weight to the matrix 1.

The dispersion particles 2 consisting of the above described composite oxide particles possess an effect suppressing the growth of the crack developing in the matrix 1, even under high temperature environment, their shape can be maintained. Therefore, the strength and the toughness of the matrix 1 consisting of the oxide based ceramic material can be significantly improved under high temperature atmosphere.

Further, since the composite oxide particles including the first and the second metallic element can be produced at a relatively low temperature below the sintering temperature of the matrix 1, the particle growth of the matrix 1 due to production (synthesis) of the dispersion particles 2 is not likely to be invited. This is effective on suppressing the strength deterioration of the matrix 1 due to the particle growth. Further, since the composite oxide particles are produced in the heat treatment step, the dispersion particles 2 can be disposed in a dispersing manner uniformly and isotropically in the matrix 1. Therefore, the strength and toughness of the matrix 1 can be uniformly enhanced with stability.

In addition, the dispersion particles 2 produced in the course of firing, through incorporation within the grains of the matrix 1, have excellent coherency to the matrix 1. Therefore, deterioration of the strength and toughness due to deterioration of the coherency of the matrix 1 is not invited. Further, if a composite oxide of high melting point is selected as the dispersion particle 2, the deformation due to sintering between the composite oxides themselves can be suppressed.

Thus, the dispersion particles 2 consisting of the composite oxide particles including the first metallic element and second metallic element are very low in a risk of deteriorating the characteristics inherent to the matrix 1 consisting of the oxide based ceramic material, and further show a large effect suppressing development of the crack within the matrix 1. Therefore, the strength and toughness, under the high temperature atmosphere, of the oxide based ceramic material constituting the matrix 1 can be drastically enhanced.

The ceramic composite member 3 uses an oxide based ceramic material, which does not invite deterioration due to oxidation when used under high temperature in the air atmosphere, as the matrix 1, and the strength and toughness value of such matrix 1 under high temperature atmosphere are enhanced with the dispersion particles 2. From these, according to the ceramic composite member 3, under high temperature such as exceeding 1273 K and air atmosphere, the high strength and high toughness can be maintained over a long term.

Incidentally, depending on the firing conditions, a composite oxide between at least one kind of the second metallic element selected from W, Ti, Ta, Mo, Nb, V, B, Te, Ge and Si, and a constituent element (Zr or Y for example) of the matrix 1 may be formed. As such composite oxides, $ZrTiO_4$, $Zr_5Ti_7O_{24}$, $ZrNb_2O_7$, $Y_2TiO_5$, $Y_3NbO_7$ can be cited. These composite oxides, having a function to enhance the coherency between the matrix 1 and the dispersion particles 2, contribute in enhancement of the toughness value.

Next, a producing method of a ceramic composite member 3 consisting of the above described ceramic composite sinter will be described in detail.

First, in an oxide based ceramic material constituting the matrix 1, at least one kind of the first metallic element selected from the alkaline earth metals such as Mg, Ca, Sr, Ba, and at least one kind of the second metallic element selected from W, Ti, Ta, Mo, Nb, V, B, Te, Ge and Si are mingled to prepare raw material powder of a ceramic sinter. As the starting substances of the alkaline earth element and metallic element, for instance, oxides or carbonates being reduced to oxides through heat treatment can be employed, but other compounds than these can be employed. However, rather than the carbonates which evolves gas, it is preferred to form the composite oxide particles through addition of the oxide.

The first metallic element (alkaline earth element) and the second metallic element, raw material forming the dispersion particles 2, are mixed with the matrix material in the following manner.

(1) A compound including an alkaline earth element and a compound including the above described second metallic element, or a mixture thereof, are mixed into an oxide based ceramic material constituting the matrix.

(2) A compound including an alkaline earth element and a compound including a second metallic element are reacted in advance to form a composite oxide, powder of the composite oxide is mixed into an oxide based ceramic material.

(3) Powder in which either one of a compound including an alkaline earth element or a compound including the second metallic element is dispersed within the ceramic particles constituting the matrix, and powder of the other compound are mixed.

According to the (2) method of the above, since precipitating reaction of the dispersion particles 2 consisting of the composite oxide particles is enhanced, the heat treatment precipitating the dispersion particles 2 can be carried out at a relatively low temperature and in a short time. According to (3) method, compared with (1) or (2) methods, the dispersion particles 2 can be dispersed more uniformly in the matrix 1.

Further, when the matrix 1 is constituted of zirconia, as a means adding an alkaline earth oxide such as MgO or CaO, a Mg stabilized zirconia, a Ca stabilized zirconia, a zirconia of which crystal structure is stabilized with Mg or Ca and a rare earth element such as Y, a composite oxide between MgO or CaO and zirconia can be used. In particular, when a Mg stabilized zirconia or a Ca stabilized zirconia is used as a Mg or Ca supplying source, since a monoclinic zirconia is formed when Mg or Ca is separated in the course of heat treatment, it is desirable from the thermal stress relaxation point of view.

For instance, when, through addition of MgO and $WO_3$ to $Y_2O_3$ stabilized zirconia, $MgWO_4$ particles and the like are dispersed within the $Y_2O_3$ stabilized zirconia, the following various mixing methods can be employed, (i) to $Y_2O_3$ stabilized zirconia, MgO and $WO_3$ are added and mixed, (ii) stabilized zirconia in which MgO and $Y_2O_3$ are dissolved simultaneously is prepared, to which $WO_3$ is added and mixed, (iii) to $Y_2O_3$ stabilized zirconia and MgO stabilized zirconia, $WO_3$ is added and mixed, (iv) MgO and $WO_3$ are mixed in advance, the mixture is added to $Y_2O_3$ stabilized zirconia and mixed. In particular, in the case of (iv), after advanced mixing of MgO and $WO_3$, if adjusted to an adequate particle diameter through size enlargement, the particle diameter (includes a coagulated diameter) or aspect ratio of the composite oxide particles to be formed can be varied arbitrarily.

The compounding composition of raw material powder of the above described composite member (sinter) can be appropriately set according to quantity of the dispersion particle 2 to be existed in the matrix 1, the composition of the targeted composite oxide particles. As a typical compounding composition, a composition which includes at least one kind selected from 0.1 to 30% by weight of MgO and 0.1 to 30% by weight of CaO (total quantity of the alkaline earth oxide is 0.1 to 30% by weight), and at least one kind selected from 0.1 to 30% by weight of $WO_3$, 0.1 to 25% by weight of $TiO_2$, 0.1 to 30% by weight of $Ta_2O_5$, 0.1 to 30% by weight of $MoO_3$ and 0.1 to 30% by weight of $Nb_2O_5$ (total quantity of metal oxide is 1 to 50% by weight), the rest of which is a stabilized $ZrO_2$, can be cited. The alkaline earth oxide can be SrO and BaO.

Next, the mixture including an oxide based ceramic powder destined to form the matrix 1, the first metallic element (alkaline earth element) and the second metallic element, is calcined, and crushed according to demands. Such powder is formed into a desired shape, the formed body is fired. Calcination is carried out, when the oxide is employed, at about 773 to 1273 K. Further, in order to suppress coagulation of powder particles due to calcination, firing can be carried out without carrying out calcination.

Firing step is largely divided in a heat treatment to precipitate mainly the dispersion particles 2 and a heat treatment to sinter the matrix particles such as zirconia particles. The firing (including calcination) can be carried out in the air atmosphere, also can be carried out in a vacuum atmosphere or in an inert atmosphere. The dispersion particles 2 consisting of the composite oxide are precipitated in the temperature range of 773 to 1673 K as described above, but the temperature can be preferably set according to the kinds of the composite oxide to be precipitated. That is, when a composite oxide high in its melting point is to be produced, the heat treatment temperature is set at a higher side. When the vapor pressure of a compound to be reacted with MgO is high, the composite oxide can be produced at a relatively low temperature.

In order to carry out in a short time the heat treatment to precipitate the dispersion particles 2, the heat treatment is preferable to be carried out in the temperature range of 1123 to 1673 K. The heat treatment temperature above 773 K can precipitate the dispersion particles 2, however, at below 1123 K, the longer reaction time is required. On the contrary, when it exceeds 1673 K, the particle growth of the matrix particles tends to occur, resulting in likability of being deteriorated in strength and toughness value. Incidentally, the heat treatment precipitating the dispersion particles 2 can be carried out independently of the firing step of the matrix 1, but, in the course of temperature elevation of the firing step, the dispersion particles 2 can be precipitated.

The firing step of the matrix 1 is carried out, for instance, for 1 to 10 hours in the temperature range of 1673 to 1773 K. The firing step is preferred to be carried out in as short time as possible, thereby the matrix 1 can be disturbed from the particle growth of the matrix 1. As a result, a high strength member can be obtained. When the matrix forming material of fine particles is employed, further firing can be carried out at below 1673 K. This is desirable to suppress the particle growth accompanying sintering.

In the firing step of the matrix 1, the composite oxide particles precipitated below that temperature are incorporated within the grains of the matrix 1 or at the grain boundary, thereby are disposed in a dispersing manner as the dispersion particles 2 inside the matrix 1. In other words, by sintering an oxide based ceramic material in which the composite oxide particles are dispersed, a ceramic composite member 3 in which the dispersion particles 2 consisting of the composite oxide particles are disposed in the matrix 1 in a dispersing manner can be obtained.

Figure 2:
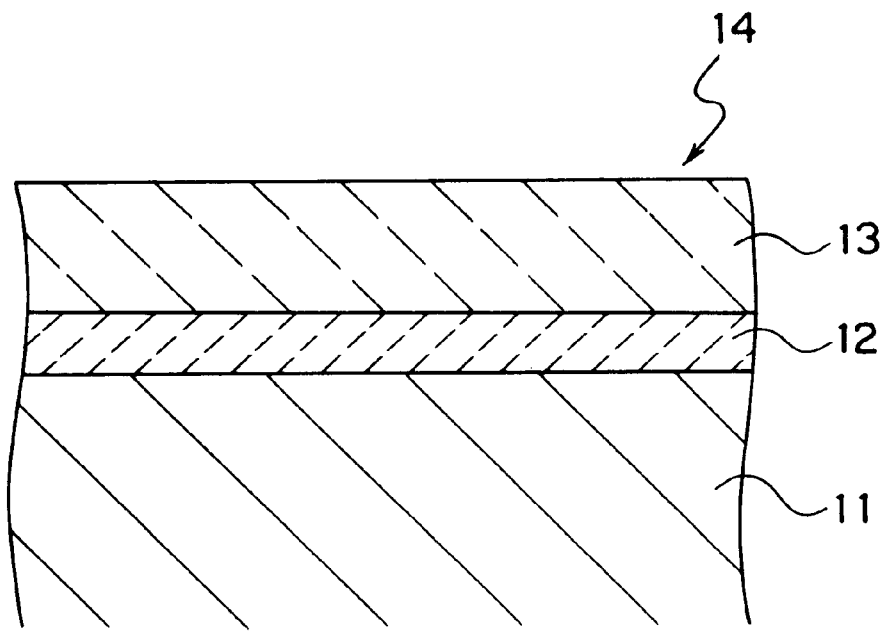
FIG. 2 is a cross-sectional view of a structure of an essential portion of one embodiment of a heat resistant member to which ceramic layer a ceramic composite material of the present invention is applied.
Figure 3:
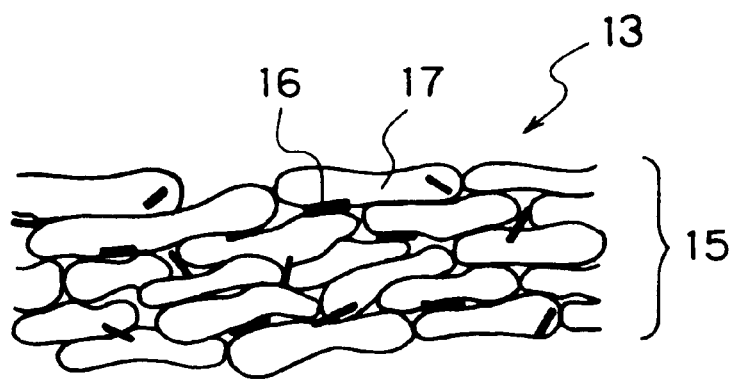
FIG. 3 is a diagram schematically showing a microstructure of the ceramic layer shown in FIG. 2.

Next, an embodiment in which the ceramic composite material is applied to a ceramic layer as a heat shielding coating will be described. FIG. 2 is a cross-sectional view showing a constitution of one embodiment of a heat resistant member having a heat shielding coating to which the present invention is applied. FIG. 3 is a diagram showing schematically a microstructure of a ceramic layer as a heat shielding coating in the heat resistant member shown in FIG. 2.

In FIG. 2, reference numeral 11 is a metal basis. The metal basis 11 is consisting of an alloy in which at least one kind of element selected from Ni, Co and Fe is a main component. For the metal basis 11, according to its use, various kinds of known heat resistant alloys can be appropriately selected to be used. For practical purposes, Ni based superalloys such as IN738, IN738LC, IN939, Mar-M247, RENE80, CM-247, CMSX-2, CMSX-4, and Co based superalloys such as FSX-414, Mar-M509 are effective.

On a surface of the metal basis 11, as a corrosion-resistant/oxidation-resistant metal coating layer, an M—Cr—Al—Y alloy (M denotes at least one kind of element selected from Ni, Co and Fe) layer 12 is formed to cover. The M—Cr—Al—Y alloy layer 12, since possessing a thermal expansion coefficient intermediate between the metal basis 11 and a ceramic layer 13 which will be described later, shows a relaxation effect of the thermal expansion difference.

For the M—Cr—Al—Y alloy layer 12, judging an overall formation object such as described above, generally, an alloy which includes 0.1 to 20% by weight of Al, 10 to 35% by weight of Cr, 0.1 to 5% by weight of Y, and the rest of which is a composition essentially consisting of at least one kind of element selected from Ni and Co, can be preferably used. Incidentally, at least one of Al and Cr need only be contained, and in place of Y, other active metals such as Hf, Zr, Ti can be used. According to uses, Nb, Ta, W can be included in the range of 5% by weight or less. These alloys are called overall as an M—Cr—Al—Y alloy. In specific, a NiCoCrAlY alloy, a CoNiCrAlY alloy, a NiCrAlY alloy, a CoCrAlY alloy, an FeCrAlY alloy can be preferably used.

The M—Cr—Al—Y alloy layer 12 can be formed with various kinds of film formation method such as thermal spraying, PVD, CVD and the like, but, from practical purpose, a plasma spraying is the most effective one. Among the plasma spraying, low pressure plasma spraying in which thermal spraying process is carried out in a decompression atmosphere is particularly preferable. Thereby, the M—Cr—Al—Y alloy layer 12 is prevented from being oxidized during film formation, thus can provide an excellent oxidation-resistance. The thickness of the M—Cr—Al—Y alloy layer 12 can be selected from the range of about 10 to 500 μm according to uses, for instance, in the case of a gas turbine vane, about 50 to 300 μm is appropriate from the point of view of oxidation life or stress relaxation effect between the metal basis 11 and the ceramic layer 13.

On the M—Cr—Al—Y alloy layer 12 that is described above, a ceramic layer 13 is formed covering as a heat shielding coating. From these respective constituent elements, a heat resistant member 14 to be used as a constituent material of a high temperature instrument is constituted. The ceramic layer 13 can be formed with thermal spraying such as plasma spraying, high-velocity oxygen fuel combustion flame spraying (HVOF method), various kinds of film formation method such as PVD, CVD, spin coating, but, in particular when the ceramic layer 13 is formed with thermal spraying, the present invention is effective. Above all, the plasma spraying is the most effective for the practical purpose.

Incidentally, the ceramic layer 13 is not restricted to be formed on the metal basis 11 through a metal bonding layer such as the M—Cr—Al—Y alloy layer 12, but can be formed directly on the metal basis 11. However, from point of view of suppression of oxidation and corrosion of the metal basis 11, and prevention of peeling the ceramic layer 13, it is preferable that, on the metal basis 11, the M—Cr—Al—Y alloy layer 12 is formed, thereon the ceramic layer 13 is formed covering.

The above described ceramic layer 13, as shown in FIG. 3, comprises a matrix 15 mainly constituting a ceramic layer 13, and dispersion particles 16 consisting of a composite oxide disposed in a dispersing manner within the particles and between the particles of the matrix 15. Here, FIG. 3 shows a ceramic layer 13 formed with the thermal spraying, the matrix 15 being consisted of the spray solidification particles (melt solidification particles) 17.

Within the particles or between the particles of the spray solidification particles 17 constituting such a matrix 15, the dispersion particles 16 consisting of the composite oxide exist. As identical as the dispersion particles 2 in the previously described composite sinter, the dispersion particles 16 are composed of a composite oxide including at least one kind of a first metallic element selected from the alkaline earth metals such as Mg, Ca, Sr, Ba, and at least one kind of a second metallic element selected from W, Ti, Ta, Mo, Nb, V, B, Te, Ge and Si, and are precipitated particles due to the reaction product between the alkaline earth element and the metallic element.

For instance, with a mixture in which an alkaline earth oxide such as MgO and CaO, and an oxide containing at least one kind of the second metallic element selected mainly from W, Ti, Ta, Mo and Nb are mixed with the ceramic material constituting the matrix, as a raw material powder for thermal spraying, the ceramic layer 13 is formed to cover with the thermal spraying. When heat treatment is applied to the ceramic layer (sprayed layer) 13, the above described compounds react each other at a relatively low temperature which does not adversely affect on the metal basis 11, a composite oxide including the alkaline earth element and the second metallic element is produced. Further, through selection of the heat treatment condition, sintering and the like occur between the above described composite oxide particles, thereby planar particles or acicular particles are grown to be precipitated.

Thus, the dispersion particles 16 consisting of the planar particles or the acicular particles can be precipitated within the particles or between the particles of the spray solidification particles 17. The dispersion particles 16 consisting of the composite oxide particles precipitated due to the heat treatment suppresses the growth of the developing crack within the ceramic layer 13 consisting of the spray solidification particles 17. Through such a action of the dispersion particles 16, the peeling resistant life of the ceramic layer 13 can be enhanced.

Figure 4:
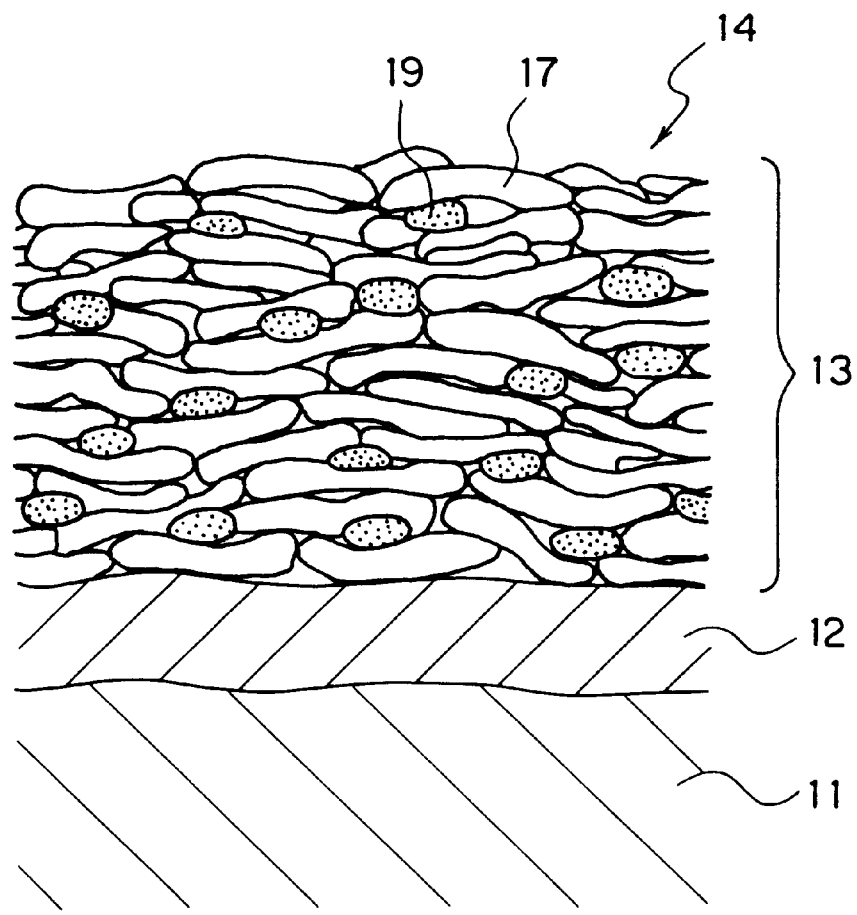
FIG. 4 is a cross-sectional view schematically showing a structure of an essential portion of another embodiment of a heat resistant member in which a ceramic composite material of the present invention is applied to a ceramic layer.
Figure 5:
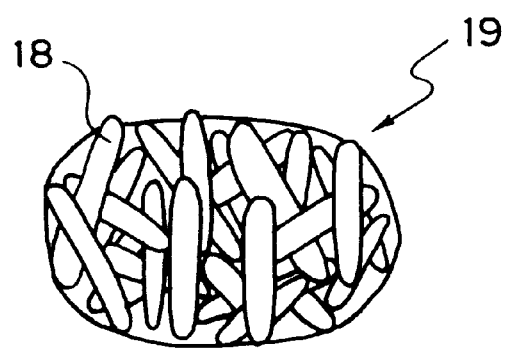
FIG. 5 is a diagram schematically showing a structure of coagulated particles existing in the ceramic layer of FIG. 4.

The dispersion particles to be precipitated within the particles or between the particles of the spray solidification particles 17, as shown in FIG. 4 and FIG. 5, can be the coagulated particles 19 which coagulated, precipitated the reaction product particles (composite oxide particles) 18 between the alkaline earth element and the metallic element. Through control of the heat treatment condition and the particle diameter of the raw material powder, sintering or the like can occur between the composite oxide particles to grow to the planar particles or the acicular particles, and, at the same time, coagulation occurs, thus such coagulated particles 19 can be obtained.

The composite oxide particles 18 constituting the coagulated particles 19 possess respectively the crack development suppression effect, since such composite oxide particles 18 are employed as the coagulated particles, far larger crack development suppression effect can be obtained. That is, when the crack goes passing through the coagulated particle, in addition to the crack development suppression effect due to the individual composite oxide particle 18, the stress relaxation occurs due to destruction of the coagulated particle 19. Therewith, more larger crack development suppression effect can be obtained.

The dispersion position of the dispersion particles 16 consisting of the planar particles or the acicular particles, or the coagulated particles 19 thereof is not particularly restricted, but, if it is disposed in a dispersing manner between the particles of the spray solidification particles 17, the development of the crack propagating within the ceramic layer 13 is effectively suppressed. Further, since the coagulated particles 19 include pores between the composite oxide particles 18, without deteriorating the relaxation property of the thermal stress of the ceramic layer 13, the crack development suppression effect is exhibited.

The composite oxide constituting the dispersion particles 16 or the coagulated particles 19 needs only contain at least one kind of the alkaline earth element (the first metallic element) selected from Mg, Ca, Sr, Ba, and at least one kind of the second metallic element selected from W, Ti, Ta, Mo, Nb, V, B, Te, Ge and Si, but can include elements other than these. The produced composite oxides differ depending on the kinds of the elements added during formation of the ceramic layer 13 and their compositions. The specific composite oxides are as mentioned above.

In particular, in a heat resistant member 14 to be used at a high temperature atmosphere (for instance, 1123 K or more) for a long time, $MgWO_3$, $MgMoO_4$, $Mg_2TiO_4$, $MgTiO_3$, $MgTi_2O_5$, $MgTa_2O_6$, $Mg_4Ta_2O_9$, $MgNb_2O_6$, $Mg_4Nb_2O_9$, and similar composite oxides including Ca, or mixture thereof are preferable to be precipitated as the dispersion particles 16 or the coagulated particles 19.

The precipitation shape of the composite oxide particles constituting the dispersion particles 16 or the coagulated particles 19 is preferable to be a planar particle or an acicular texture. By precipitating the particles of such shapes or the particles coagulated thereof between the spray solidification particles 17, the development of the crack can be suppressed. The planar particles and the acicular particles are as mentioned above. Here, the planar particle as the dispersion particle 16 possesses a shape apparently different shape a compressed particle called as a lamella structure such as seen in the conventional spray solidification particle 17.

The coagulated particles 19 are preferable to have a structure in which the composite oxide particles 18 of the planar shape or the acicular shape are entangled through mutual coupling, thereby the propagation of the crack can be more effectively suppressed. The coagulated diameter of the composite oxide particle 18 is not particularly restricted, but it is preferable to be similar degree with the matrix particles (spray solidification particle 17) constituting the ceramic layer 13, or smaller than that diameter. In specific, the diameter of the coagulated particles 19 is preferable to be in the range of 10 to 100 $\mu$m, and with such a coagulated diameter, the crack development suppression effect can be effectively exhibited.

The dispersion particles 16 or the coagulated particles 19 consisting of such a composite oxide as described above are preferable to be disposed in a dispersing manner in the range of 1 to 50% (by weight ratio) to the matrix material of the ceramic layer 14. When the amount of the dispersion particles 16 or the coagulated particles is less than 1% by weight to the matrix material, the suppression effect sufficient to suppress the development of the crack is probable not to be obtained. On the contrary, when the amount of the dispersion particles 16 or the coagulated particles 19 exceeds 50% by weight, the characteristics inherent to the matrix material is probable to be damaged. The amount of the dispersion particles 16 or the coagulated particles 19 is more preferable to be in the range of 5 to 40% by weight to the matrix material.

The dispersion particles 16 and the coagulated particles 19 are dispersed to portions where the cracks in the ceramic layer 13 develop. In specific, since a crack is likely to develop around an interface between the M—Cr—Al—Y alloy layer 12 and the ceramic layer 13 due to the thermal stress, disposition of the dispersion particles 16 or the coagulated particles 19 is preferred to be done in the range of about 300 $\mu$m from the interface. Further preferable to be in the range of about 200 $\mu$m from the interface.

When possessing a texture in which the stress is aimed to be relaxed by introduction of longitudinal cracks in a ceramic layer 13, at the time of generation of the longitudinal crack, the transversal crack causing peeling/drop out happen to occur. The transversal crack can occur at an unspecified position of the ceramic layer 13. In such a case, the dispersion particles 16 or the coagulated particles 19 are preferred to be existed overall the ceramic layer 13.

Besides, in a ceramic layer 13 as a heat shielding coating, since peeling/drop out due to Foreign Object Damage (FOD) or erosion damage also can occur, from the view point of prevention of the deterioration due to these, the dispersion particles 16 or the coagulated particles 19 can be dispersed in the neighbor of the surface. Further, when the composite oxide particles are dispersed in the neighbor of the outer surface of the ceramic layer 13, micro-cracks occur due to volume change during chemical reaction, relaxation property of the stress of the ceramic layer 13 can be enhanced. Therewith, erosion characteristics also can be improved simultaneously.

In particular, the surface and its neighbor of the ceramic layer 13 is likely to be exposed for a long time to a temperature higher than the heat treatment temperature to form the composite oxide particles. In such a case, if $TiO_2$ is used as a starting substance, it reacts with zirconia constituting the ceramic layer 13 to produce $ZrTi_2O_7$ particles and the like, resulting in further enhancement of the erosion characteristics.

The particles to be dispersed in the neighbor of the interface with the M—Cr—Al—Y alloy layer 12 and the outer surface side of the ceramic layer 13, can be same or different in their compositions. When there is a temperature gradient in the ceramic layer 13 like the heat shielding coating, in the neighbor of the outer surface of the high temperature portion the composite oxide particles of high melting point are dispersed, in the neighbor of the interface of the low temperature portion the composite oxide particles of lower melting point than that of the former can be dispersed.

As a matrix material 15 constituting the ceramic layer 13, in order to relax the thermal stress occurring due to thermal expansion coefficient difference with the metal basis 11, oxides of 4A group metals such as zirconium oxide, hafnium oxide, titanium oxide or rare earth oxide such as cerium oxide($CeO_2$) all of high thermal expansion coefficient can be employed preferably. In particular, a mixture in which the oxides of 4A group metals represented by $ZrO_2$ is a main component, and thereto rare earth oxides such as yttrium oxide, cerium oxide or alkaline earth oxides are added, can be employed preferably.

In zirconium oxide($ZrO_2$), in order to suppress phase transition being caused due to thermal hysteresis, a partially stabilized zirconia or a stabilized zirconia both of which are constituted mainly in tetragonal or cubic system through addition of the rare earth oxide or the alkaline earth oxide is preferably employed. Further, when about 1 to 30% by weight of monoclinic zirconia is distributed within the ceramic layer 13, since microcracks can be formed in the layer, it is preferable from thermal stress relaxation point of view.

The thickness of the ceramic layer 13, though depending on uses of the heat resistant member 14, is preferable to be in the range of about 50 to 500 $\mu$m. The structure of the ceramic layer 13 is not restricted particularly, but, for instance, when covering is carried out under single thermal spraying condition (for instance, raw material powder), the condition which causes the surface roughness large is preferably employed to form. The surface roughness immediately after covering, when measured with $R_Z$ is preferable to be 50 $\mu$m or more, further preferable to be 52 $\mu$m or more. The hardness of the ceramic layer 13 in this case is preferable to be 650 Hv (weight of 200 gf, 30 second) or less by Vickers hardness. With these, the ceramic layer 13 excellent in relaxation characteristics of the thermal stress is obtained, exhibiting the effect of the longer life of the heat resistant member 14.

When the ceramic layer 13 is formed covering under a plurality of thermal spraying conditions, a range of up to about 200 $\mu$m from the interface with the M—Cr—Al—Y alloy layer 12 is preferable to be covered with a state of small surface roughness (for instance, 50 μm or less by Rz, more preferable to be 48 μm or less), thereafter, preferable to be covered with a state of large surface roughness as described above (for instance, 50 μm or more by Rz). The initial hardness of the covered layer is preferable to be 650 Hv (weight of 200 gf, for 30 seconds) or more by Vickers hardness. According to such a ceramic layer 13, occurrence of the cracks can be suppressed, and further relaxation characteristics of the thermal stress can be enhanced, resulting in improvement of the peeling life of the ceramic layer 13. In particular, when the thickness of the ceramic layer 13 is made 200 μm or more, the ceramic layer 13 of such a multi-layer structure is preferable to be applied.

Next, a formation method of the above described ceramic layer 13 will be described. Here, a case where a ceramic layer 13 is formed with thermal spraying will be described. When other film formation method is employed, according to the selected film formation method, various conditions are determined.

First, into ceramic material constituting the matrix of the ceramic layer 13, at least one kind of a first metallic element selected from the alkaline earth metals such as Mg, Ca, Sr, Ba, and at least one kind of a second metallic element selected from W, Ti, Ta, Mo, Nb, V, B, Te, Ge and Si are mixed to prepare thermal spray raw material powder. The starting substances of the first and the second metallic elements, or mixing methods of the ceramic materials constituting the matrix are similarly carried out with the above described first embodiment. For instance, the above described mixing method of (1) to (3), further (i) to (iv) can be employed as the mixing method.

The compounding composition of the thermal spray raw material powder can be adequately determined according to the quantity of the dispersion particles 16 or the coagulated particles 19 to be existed in the ceramic layer 13, the composition of the targeted composite oxide particles. The typical compounding composition is as mentioned above. The particle diameter of the thermal spray raw material powder is preferable to be in the range of 1 to 150 μm in order not to degrade the adherent efficiency of the thermal spraying, more preferable to be in the range of 1 to 125 μm. Further, if the heat treatment is carried out before and after classification of the prescribed powder, scattering of the powder can be suppressed when the powder passes plasma flame during the thermal spraying.

When the coagulated particles 19 are made exist in the ceramic layer 13, its coagulated diameter depends indirectly on the alkaline earth oxide powder to be a starting substance of the composite oxide particles 18 or on the diameter of the individual particle constituting the compound powder including the second metallic element. Therefore, in the above described method of (1), the particle diameter of the alkaline earth oxide powder or the oxide powder of the second metallic element, or mixed powder thereof, is adequately adjusted according to the targeted coagulated diameter. When the relatively large coagulated particles 19 are to be dispersed, the powder of the particle diameter of, for instance, 44 μm or more is employed preferably. When the relatively small coagulated particles 19 are to be dispersed, powder of the particle diameter of, for instance, about 1 to 44 μm, or powder coagulated them loosely can be employed preferably.

In the above described method of (2), the particle diameter of the composite oxide powder formed through reaction in advance is adequately adjusted according to the targeted coagulated diameter. The specific particle diameter is same with the case of method (1). Further, when the method of (3) is employed, the particle diameter of the other compound powder, which is mixed to the powder being dispersed with either one of the alkaline earth oxide or the oxide of the second metallic element within the ceramic particle, is adjusted, or the size of the substance to be dispersed within the ceramic particles is adequately adjusted. Therewith, the coagulated particles 19 of the desired coagulated diameter can be obtained.

Next, with the above described thermal spray raw material powder, on the M—Cr—Al—Y alloy layer 12 formed on the metal basis 11, with, for instance, plasma spraying, the ceramic layer 13 is formed. Incidentally, with a plurality of thermal spray guns, from the respective spray gun, respective raw material powder (raw material powder of the matrix material powder and the raw material powder of the composite oxide particles, or a mixture of a part of them) can be sprayed to form the ceramic layer 13.

When heat treatment is carried out to the obtained ceramic layer 13, the alkaline earth oxides such as MgO or CaO dispersed in the ceramic layer 13 and the oxides of the metallic elements such as W, Ti, Ta, Mo, Nb react to form the composite oxides as described above. Further, sintering occurs between such composite oxide particles (or particles added as the composite oxide in advance), the planar particles or the acicular particles are grown to be precipitated. Or, precipitated as the coagulated particles.

Thus, the ceramic layer 13, in which the dispersion particles 16 consisting of the composite oxide particles such as shown in FIG. 3 are disposed in a dispersing manner within the particles or between the particles of the spray solidification particles 17, can be obtained. Or, the ceramic layer 13, in which the coagulated particles 19 of the composite oxide particles 18 such as shown in FIG. 4 are disposed in a dispersing manner within the particles or between the particles of the spray solidification particles 17, can be obtained. In this case, since the composite oxide particles (dispersion particles 16) or the coagulated particles thereof 19 are precipitated through implementation of the heat treatment after formation of the ceramic layer 13, even with the ceramic layer 13, to which a coating method such as thermal spraying wherein the initial particle shape is lost is applied, the dispersion particles 16 or the coagulated particles 19 can be dispersed therein with excellent reproducibility.

Since the dispersion particles 16 or the coagulated particles 19 consisting of the composite oxide can be reacted and precipitated at a temperature in the range of about 773 to 1673 K as described above, the temperature condition during the heat treatment is determined in the range of 773 to 1673 K. Such a heat treatment temperature does not adversely affect on the metal basis 11 consisting of Ni based superalloy or Co based superalloy. The heat treatment temperature is desirable to be determined according to the kinds of the composite oxides to be precipitated. The heat treatment can be carried out in the air, but, taking into consideration the deterioration of the metal basis 11, can be carried out in the inert atmosphere.

Since the dispersion particles 16 or the coagulated particles 19 consisting of such as the above described composite oxides possess an effect suppressing the development of the cracks in the ceramic layer 13, and the particle shape thereof can be maintained even under high temperature environment, the development of the cracks in the ceramic 13 can be effectively suppressed. With such a crack development suppression effect, the peeling of the ceramic layer 13 due to the thermal stress being produced when the heat resistant member 14 is used under high temperature atmosphere can be suppressed with stability. That is, the peeling resistance property of the ceramic layer 13 can be remarkably improved.

Further, the composite oxide particles as the dispersion particles 16 or the coagulated particles 19, at the start, are mixed in the matrix material of the ceramic layer 13 as such as compound powder and the like, and are reacted to produce during heat treatment step after formation of the ceramic layer 13. Therefore, even within the ceramic layer 13 to which a coating method such as the thermal spraying in which the initial particle shape is lost is applied, the composite oxide particles or the coagulated particles thereof possessing crack development suppression effect can be dispersed with excellent reproducibility.

Next, concrete embodiments of the present invention and their evaluation results will be described.

Embodiment 1

To 100 g of 3.0 mol%$Y_2O_3$—$ZrO_2$ powder, 2.96 g of MgO powder of particle diameter of 0.1 to 2 $\mu$m and 17.04 g of $WO_3$ powder are added, they are mixed with acetone in wet. After this mixed powder is enlarged in particle size with 2% PVA water solution, is formed in a block. This block shape formed body is heated to 1673 K, and fired at this temperature for 2 hours.

On examining with XRD the microstructure texture of the obtained sinter by partially crushing, $MgWO_4$ is found to exist in the $Y_2O_3$ stabilized $ZrO_2$. Further, when observed the cross-sectional texture of the sinter, the planar $MgWO_4$ particles (dispersion particle) of aspect ratio of about 1 to 20 and of a thickness of about 0.1 to 5 $\mu$m are confirmed. The dispersion particles were found to exist in the ratio of about 20% by weight to the $Y_2O_3$ stabilized $ZrO_2$. This sample is evaluated as to the characteristics that will be described later.

Embodiment 2

The powder is prepared by dissolving in advance 1.5% by weight of MgO into 3.0 mol%$Y_2O_3$—$ZrO_2$ powder, to 100 g of this powder, 8.5 g of $WO_3$ powder is added, they were mixed with acetone in wet. After this mixed powder is enlarged in particle size with 2% PVA water solution, is formed into a block. This block shape formed body is heated to 1673 K, and is kept there for 2 hours.

On examining with XRD the microstructure texture of the obtained sinter by partially crushing, $MgWO_4$ is found to exist in the $Y_2O_3$ stabilized ZrO. Further, when observed the cross-sectional texture of the sinter, the planar $MgWO_4$ particles (dispersion particle) of aspect ratio of about 1 to 20 and of a thickness of about 0.1 to 5 $\mu$m are confirmed. The dispersion particles were found to exist in the ratio of about 10% by weight to the $Y_2O_3$ stabilized $ZrO_2$. This sample is evaluated as to the characteristics that will be described later.

Embodiment 3

To 100 g of 3.0 mol%$Y_2O_3$ —$ZrO_2$ powder, 5.9 g of MgO powder of a particle diameter of 0.1 to 2 $\mu$m and 34.07 g of $WO_3$ powder are added, they are mixed with acetone in wet. This mixed powder, after being enlarged in particle size with 2% PVA water solution, is formed into a block. This block shape formed body is heated to 1673 K, and is kept there for 2 hours.

On examining with XRD the microstructure texture of the obtained sinter by partially crushing, $MgWO_4$ was found to exist in the $Y_2O_3$ stabilized $ZrO_2$. Further, when observed the cross-sectional texture of the sinter, the planar $MgWO_4$ particles (dispersion particle) of the aspect ratio of about 1 to 20 and of a thickness of about 0.1 to 5 $\mu$m are confirmed. The dispersion particles existed in the ratio of about 40% by weight to the $Y_2O_3$ stabilized $ZrO_2$. This sample is evaluated as to the characteristics that will be described later.

Embodiment 4

The powder is prepared by dissolving in advance 8% by weight of MgO into 3.0 mol%$Y_2O_3$—$ZrO_2$ powder, to 100 g of this powder, 32 g of $TiO_2$ powder is added, they were mixed with acetone in wet. This mixed powder, after being enlarged in particle size with 2% PVA water solution, is formed into a block. This block shape formed body is heated to 1673 K, and is kept there for 2 hours.

On examining with XRD the microstructure texture of the obtained sinter by partially crushing, $MgTi_2O_5$ is found to exist in the $Y_2O_3$ stabilized $ZrO_2$. Further, when observed the cross-sectional texture of the sinter, the planar $MgTi_2O_5$ particles (dispersion particle) of aspect ratio of about 1 to 20 and of a thickness of about 0.1 to 5 $\mu$m are confirmed. The dispersion particles were found to exist in the ratio of about 40% by weight to the $Y_2O_3$ stabilized $ZrO_2$. This sample is evaluated as to the characteristics that will be described later.

Embodiment 5

To 70 g of 3.0 mol%$Y_2O_3$—$ZrO_2$ powder, 6 g of CaO powder of a particle diameter of 0.1 to 2 $\mu$m and 2.5 g of $WO_3$ powder are added, they are mixed with acetone in wet. This mixed powder, after being enlarged in particle size with 2% PVA water solution, is formed into a block. This block shape formed body is heated to 1673 K, and is kept there for 2 hours.

On examining the microstructure texture of the obtained sinter with XRD by partially crushing, $CaWO_4$ is found to exist in the $Y_2O_3$ stabilized $ZrO_2$. Further, when observed the cross-sectional texture of the sinter, the planar $CaWO_4$ particles (dispersion particle) of aspect ratio of about 1 to 20 and of a thickness of about 0.1 to 5 $\mu$m are confirmed. The dispersion particles were found to exist in the ratio of about 30% by weight to the $Y_2O_3$ stabilized $ZrO_2$. This sample is evaluated as to the characteristics that will be described later.

Embodiment 6

The powder is prepared by dissolving in advance 5% by weight of CaO into 3.0 mol%$Y_2O_3$—$ZrO_2$ powder, to 100 g of this powder, 15 g of $TiO_2$ powder is added, this was mixed with acetone in wet. This mixed powder, after being enlarged in particle size with 2% PVA water solution, is formed into a block. This block shape formed body is heated to 1673 K, and kept there for 2 hours.

On examining the microstructure composition of the obtained sinter with XRD after partially crushing, $CaTi_2O_5$ is found to exist in the $Y_2O_3$ stabilized $ZrO_2$. Further, when observed the cross-sectional texture of the sinter, the planar $CaTi_2O_5$ particles (dispersion particle) of aspect ratio of about 1 to 20 and of thickness of about 0.1 to 5 $\mu$m are confirmed. The dispersion particles were found to exist in the ratio of about 20% by weight to the $Y_2O_3$ stabilized $ZrO_2$. This sample is evaluated as to the characteristics that will be described later.

Embodiment 7

To 3.0 mol%$Y_2O_3$—$ZrO_2$ powder, 2.6% by weight of MgO powder of a particle diameter of 0.1 to 2 $\mu$m is mixed, to 100 g of this powder, 17.4 g of $Nb_2O_5$ powder is further added, they are mixed with acetone in wet. This mixed powder, after being enlarged in particle size with 2% PVA water solution, is formed into a block. This block shape formed body is heated to 1723 K, and kept there for 2 hours.

On examining the microstructure texture of the obtained sinter with XRD by partially crushing the sinter, $MgNb_2O_6$ was found to exist in the $Y_2O_3$ stabilized $ZrO_2$. Further, when observed the cross-sectional texture of the sinter, the planar MgNb$_2$O$_6$ particles (dispersion particle) of an aspect ratio of about 1 to 20 and of a thickness of about 0.1 to 5 μm are confirmed. The dispersion particles were found to exist in the ratio of about 18% by weight to the Y$_2$O$_3$ stabilized ZrO$_2$. This sample is evaluated as to the characteristics that will be described later.

Embodiment 8

The powder is prepared by dissolving in advance 2.5% by weight of CaO into 3.0 mol%Y$_2$O$_3$—ZrO$_2$ powder, to 100 g of this powder, 18 g of Ta$_2$O$_5$ powder is added, they were mixed with acetone in wet. This mixed powder, after being enlarged in particle size with 2% PVA water solution, is formed into a block. This block shape formed body is heated to 1673 K, and kept there for 2 hours.

On examining the microstructure texture of the obtained sinter with XRD after partially crushing the sinter, CaTa$_2$O$_6$ was found to exist in the Y$_2$O$_3$ stabilized ZrO$_2$. Further, when observed the cross-sectional texture of the sinter, the planar CaTa$_2$O$_6$ particles (dispersion particle) of an aspect ratio of about 1 to 20 and of a thickness of about 0.1 to 5 μm are confirmed. The dispersion particles were found to exist in the ratio of about 20% by weight to the Y$_2$O$_3$ stabilized ZrO$_2$. This sample is evaluated as to the characteristics that will be described later.

Comparative Example 1

Only 3.0 mol%Y$_2$O$_3$—ZrO$_2$ powder is used to enlarge the size with 2% PVA water solution, then this is formed into a block. This block shape formed body is heated to 1673 K, and is kept there for 2 hours.

Comparative Example 2

To 3.0 mol%Y$_2$O$_3$—ZrO$_2$ powder, 2.9% by weight of MgO powder of a particle diameter of 0.1 to 2 μm is mixed, they are mixed with acetone in wet. This mixed powder, after being enlarged in particle size with 2% PVA water solution, is formed into a block. This block shape formed body is heated to 1673 K, and is kept there for 2 hours.

Comparative Example 3

To 100 g of 3.0 mol%Y$_2$O$_3$—ZrO$_2$ powder, 8.5 g of WO$_3$ powder is added, they are mixed with acetone in wet. This mixed powder, after being enlarged in particle size with 2% PVA water solution, is formed into a block. This block shape formed body is heated to 1673 K, and is kept there for 2 hours.

Incidentally, when observed cross-sectional texture of each sinter according to comparative example 1 to 3, the composite oxide particles were not precipitated in all of them.

A specimen of 50×4×3 mm was cut out from each sinter (ceramic composite member) according to the above described embodiments 1 to 8 and comparative example 1 to 3, after polishing, was evaluated of 4 points bending test at room temperature and 1273 K. The bending strength at the room temperature of each sinter of embodiment 1 to 8 was 1500 to 200 MPa, that of each sinter of comparative example 1 to 3 was 1000 to 1200 MPa. However, as to the bending strength at 1273 K, compared with the excellent value of 1300 to 1500 MPa for each sinter of embodiment 1 to 8, that of each sinter of comparative example 1 to 3 was 800 MPa, 600 MPa, 500 MPa, respectively, all being poor compared with embodiments. From these evaluation results, ceramic composite member due to each embodiment in which the planar dispersion particles were found is excellent in its mechanical characteristics under high temperature.

Embodiment 9

On a surface of a round bar consisting of a Ni based super heat resistant alloy CM-247, a NiCoCrAlY alloy layer of a thickness of about 150 μm is formed with the plasma spraying. Subsequently, with a mixed powder, in which 4% by weight of MgO powder and 2.5% by weight of WO$_3$ powder are added to 8% by weight Y$_2$O$_3$ stabilized ZrO$_2$, as a spray raw material powder, a ceramic layer of a thickness of 250 μm is formed to cover.

Next, a sample on which the ceramic layer is formed is heat treated under a condition of 1073 K and 2 hours, subsequently under a condition of 1273 K and 16 hours. When examined the constituent material of the ceramic layer after the heat treatment with XRD, it is found to be mainly constituted of Y stabilized ZrO$_2$ and MgWO$_4$. Further, when observed with SEM, planar particles consisting of MgWO$_4$ were found to be dispersed in the ceramic layer. The sample thus obtained is presented to the evaluation of the characteristics that will be described later.

Embodiment 10

On a surface of a round bar consisting of a Ni based super heat resistant alloy CMSX-2, a NiCoCrAlY alloy layer of a thickness of about 140 μm is formed with the plasma spraying. Subsequently, with a mixed powder obtained by mixing the melt pulverized powder produced by adding in advance 5% by weight of MgO to 8% by weight Y$_2$O$_3$ stabilized ZrO$_2$ and 26% by weight of WO$_3$ powder, as a spray raw material powder, a ceramic layer of a thickness of 250 μm is formed to cover.

Next, a sample on which the ceramic layer is formed is heat treated under a condition of 1073 K and 3 hours, subsequently under a condition of 1273 K and 16 hours. When examined the constituent material of the ceramic layer after the heat treatment with XRD, it is found to be mainly composed of Y stabilized ZrO$_2$ and MgWO$_4$. Further, when observed with SEM, between zirconia spray particles mainly constituting the ceramic layer, planar particles consisting of MgWO$_4$ apparently discriminated from zirconia particles were found to be dispersed. The sample thus obtained is presented to the evaluation of the characteristics that will be described later.

Embodiment 11

On a surface of a round bar consisting of a Ni based super heat resistant alloy CM-247, a NiCoCrAlY alloy layer of a thickness of about 150 μm is formed with the plasma spraying. Subsequently, with a mixed powder, in which 1.5% by weight of CaO powder and 8.5% by weight of WO$_3$ powder are mixed with 8% by weight Y$_2$O$_3$ stabilized ZrO$_2$, as a spray raw material powder, a ceramic layer of a thickness of 250 μm is formed to cover.

Next, a sample on which the ceramic layer is formed is heat treated under a condition of 1073 K and 2 hours, subsequently under a condition of 1273 K and 16 hours. When examined the constituent material of the ceramic layer after the heat treatment with XRD, it is found to be mainly constituted of Y stabilized ZrO$_2$ and CaWO$_4$. Further, when observed with SEM, planar particles consisting of CaWO$_4$ were found to be dispersed in the ceramic layer. The sample thus obtained is presented to the evaluation of the characteristics that will be described later.

Embodiment 12

On a surface of a round bar consisting of a Ni based super heat resistant alloy CMSX-2, a NiCoCrAlY alloy layer of a thickness of about 140 μm is formed with the plasma spraying. Subsequently, with a mixed powder of melt pulverized powder produced by adding in advance 2.5% by weight of CaO to 8% by weight Y$_2$O$_3$ stabilized ZrO$_2$ and 8.5% by weight of $WO_3$ powder as a spray raw material powder, a ceramic layer of a thickness of 250 μm is formed to cover.

Next, a sample on which the ceramic layer is formed is heat treated under a condition of 1073 K and 3 hours, subsequently under a condition of 1273 K and 16 hours. When examined the constituent material of the ceramic layer after the heat treatment with XRD, it is found to be mainly composed of Y stabilized $ZrO_2$ and $CaWO_4$. Further, when observed with SEM, between zirconia spray particles mainly constituting the ceramic layer, planar particles consisting of $CaWO_4$ apparently discriminated from zirconia particles were found to be dispersed. The sample thus obtained is presented to the evaluation of the characteristics that will be described later.

Embodiment 13

On a surface of a round bar consisting of a Ni based super heat resistant alloy CMSX-2, a NiCoCrAlY alloy layer of a thickness of about 140 μm is formed with the plasma spraying. Subsequently, with a powder mixture of melt pulverized powder produced by adding in advance 1.7% by weight of CaO to 8% by weight $Y_2O_3$ stabilized $ZrO_2$ and 18.4% by weight of $Ta_2O_5$ powder, as a spray raw material powder, a ceramic layer of a thickness of 250 μm is formed to cover.

Next, a sample on which the ceramic layer is formed is heat treated under a condition of 1073 K and 3 hours, subsequently under a condition of 1273 K and 16 hours. When examined the constituent material of the ceramic layer after the heat treatment with XRD, it is found to be mainly composed of Y stabilized $ZrO_2$ and $CaTa_2O_6$. Further, when observed with SEM, between zirconia spray particles mainly constituting the ceramic layer, planar particles consisting of $CaTa_2O_6$ apparently discriminated from zirconia particles were found to be dispersed. The sample thus obtained is presented to the evaluation of the characteristics that will be described later.

Embodiment 14

On a surface of a round bar consisting of a Ni based super heat resistant alloy CM-247, a NiCoCrAlY alloy layer of a thickness of about 150 μm is formed with the plasma spraying. Subsequently, with a powder mixture, in which 20% by weight of CaO powder, 10% by weight of MgO powder and 20% by weight of $TiO_2$ powder are added to 8% by weight $Y_2O_3$ stabilized $ZrO_2$, as a spray raw material powder, a ceramic layer of a thickness of 250 μm is formed to cover.

Next, a sample on which the ceramic layer is formed is heat treated under a condition of 1073 K and 2 hours, subsequently under a condition of 1273 K and 16 hours. When examined with XRD the constituent material of the ceramic layer after the heat treatment, it is found to be mainly constituted of Y stabilized $ZrO_2$, $CaTiO_3$ and $MgTi_2O_5$. Further, when observed with SEM, planar particles consisting of $CaTiO_3$ and $MgTi_2O_5$ were found to be dispersed in the ceramic layer. The sample thus obtained is presented to the evaluation of the characteristics that will be described later.

Comparative Example 4

On a surface of a round bar consisting of a Ni based super heat resistant alloy CMSX-2, a NiCoCrAlY alloy layer of a thickness of about 140 μm is formed with plasma spraying. Subsequently, with only 8% by weight $Y_2O_3$ stabilized $ZrO_2$ as the spray raw material powder, a ceramic layer of a thickness of 250 μm is formed to cover. On this sample, the heat treatment of 1073 K and 3 hours, and subsequent heat treatment of 1273 K and 16 hours was carried out, but any precipitation layer (acicular or planar) could not be found in the ceramic layer. The sample was exposed to the following characteristics evaluation.

With the samples of the above described embodiment 9 to 14 and comparative example 4, repetitive heat test was respectively carried out between under a condition of a stress of 250 MPa and in the air atmosphere at a temperature of 1123 K, which simulates the atmosphere to which the member is exposed during gas turbine operation, and under a condition of the room temperature, with 12 hours cycle time.

As the results, each sample of embodiment 9 to 14 did not show any peeling of the ceramic layer even after 1000 cycles. When the sample was observed after the test, in the Y stabilized $ZrO_2$ layer, some portion was found to show a little growth of the crack, but the development of the cracks was found to be suppressed by the dispersion particles such as planar particles. On the contrary, the sample of comparative example 4 began to peel at 700 cycles, peeled off completely at 800 cycles.

Embodiment 15

On a surface of a round bar consisting of a Ni based super heat resistant alloy CMSX-2, a NiCoCrAlY alloy layer of a thickness of about 140 μm is formed with the plasma spraying. Subsequently, with a powder mixture, in which to a mixture of 8% by weight $Y_2O_3$ stabilized $ZrO_2$ and 8% by weight CaO stabilized $ZrO_2$ mixed with the ratio of 10:2, 2% by weight of $Nb_2O_5$ powder is mixed, as a spray raw material powder, a ceramic layer of a thickness of 200 μm is formed to cover.

Next, a sample on which the ceramic layer is formed is heat treated under a condition of 1073 K and 3 hours, subsequently under a condition of 1273 K and 16 hours. When examined the constituent material of the ceramic layer after the heat treatment with XRD, it is found to be mainly constituted of Y stabilized $ZrO_2$, monoclinic $ZrO_2$ and $CaNb_2O_6$. Further, when observed with SEM, between Y stabilized zirconia particles and monoclinic zirconia particles mainly constituting the ceramic layer, planar particles consisting of $CaNb_2O_6$ apparently discriminated from the above ones were found to be dispersed. The sample thus obtained is presented to the evaluation of the characteristics that will be described later.

Comparative Example 5

On a surface of a round bar consisting of a Ni based super heat resistant alloy CMSX-2, a NiCoCrAlY alloy layer of a thickness of about 140 μm is formed with the plasma spraying. Subsequently, with a powder mixture of 8% by weight $Y_2O_3$ stabilized $ZrO_2$ and 8% by weight CaO stabilized $ZrO_2$ mixed with a ratio of 10:2, as a spray raw material powder, a ceramic layer of a thickness of 200 μm is formed to cover.

Next, a sample on which the ceramic layer is formed is heat treated under a condition of 1073 K and 3 hours, subsequently under a condition of 1273 K and 16 hours. When examined the constituent material of the ceramic layer after the heat treatment with XRD, it is found to be mainly constituted of Y stabilized $ZrO_2$ and monoclinic $ZrO_2$. Further, when observed with SEM, no precipitation phase was found inside. The sample thus obtained is presented to the evaluation of the characteristics that will be described later.

With the samples of the above described embodiment 15 and comparative example 5, repetitive heat test was respectively carried out between under a condition of a stress of 250 MPa, and in the air atmosphere of 1123 K which simulates the atmosphere to which the member is exposed during gas turbine operation, and under a condition of the room temperature, with 12 hours cycle time.

As the results, the sample of embodiment 15 did not show any peeling of the ceramic layer even after 1000 cycles. When the cross section of the sample was observed after the test, in the Y stabilized $ZrO_2$ layer, a little growth of the crack was found in some portion, but it is found that the development of the cracks was suppressed by the dispersion particles such as planar particles. On the contrary, the ceramic layer of the sample of comparative example 5 peeled off in short time of heat cycles.

Embodiment 16

On a surface of a round bar consisting of a Ni based super heat resistant alloy Mar-M247, a NiCoCrAlY alloy layer of a thickness of about 150 μm is formed with the plasma spraying. Subsequently, with a powder mixture, in which 8% by weight $Y_2O_3$ stabilized $ZrO_2$ (particle diameter distribution: 44 to 80 μm), and a powder mixture of MgO and $TiO_2$ mixed with an weight ratio of 1:2.5 (particle diameter distribution: 20 to 50 μm) are mixed with an weight ratio of 8:2, as a spray raw material powder, a ceramic layer of a thickness of 250 μm is formed to cover.

Next, a sample on which the ceramic layer is formed is heat treated by elevating the temperature from the room temperature to 1373 K in 6 hours, thereafter, being held there for 2 hours, subsequently being held at 1073 K for 16 hours. When examined with XRD the constituent material of the ceramic layer after the heat treatment, it is found to be mainly constituted of Y stabilized $ZrO_2$ and $MgTi_2O_5$. Further, when observed with SEM, between zirconia spray solidification particles mainly constituting the ceramic layer, planar particles consisting of $MgTi_2O_5$ were found to exist in coagulation. The coagulated diameter of these was about 20 to 60 μm. The sample thus obtained is presented to the evaluation of the characteristics that will be described later.

Embodiment 17

On a surface of a round bar consisting of a Ni based super heat resistant alloy CMSX-2, a NiCoCrAlY alloy layer of a thickness of about 140 μm is formed with the plasma spraying. Subsequently, with a powder mixture in which, to melt pulverized powder (particle diameter distribution: 10 to 44 μm) produced by adding in advance 1.5% by weight of MgO to 8% by weight $Y_2O_3$ stabilized $ZrO_2$, 8.5% by weight of $TiO_2$ powder (particle diameter distribution: 2 to 10 μm) is mixed, as a spray raw material powder, a first ceramic layer of a thickness of 150 μm is formed to cover. Further, thereon, with enlarged sinter powder (particle diameter distribution: 10 to 44 μm) of 8% by weight $Y_2O_3$ stabilized $ZrO_2$ as the spray raw material powder, a second ceramic layer of a thickness of 100 μm was formed.

Next, a sample on which the ceramic layer of 2 layer structure is formed is heat treated under a condition of 1373 K and 3 hours, subsequently under a condition of 1073 K and 16 hours. When carried out XRD and SEM observation of the ceramic layer after the heat treatment, it is found that, in the region of 150 μm from NiCoCrAlY alloy layer, between the Y stabilized zirconia spray particles, the planar particles consisting of $MgTi_2O_5$ were found to exist in a coagulated manner. Their coagulated diameter was about 10 to 30 μm. The sample thus obtained is presented to the evaluation of the characteristics that will be described later.

Comparative Example 6

On a surface of a round bar consisting of a Ni based super heat resistant alloy CMSX-2, a NiCoCrAlY alloy layer of a thickness of about 140 μm is formed with the plasma spraying. Subsequently, with only 8% by weight $Y_2O_3$ stabilized $ZrO_2$ powder (particle diameter distribution: 10 to 44 μm), as a spray raw material powder, a ceramic layer of a thickness of 250 μm is formed covering. This sample is heat treated under a condition of 1373 K and 3 hours, subsequently under a condition of 1073 K and 16 hours, but any precipitation layer (acicular or planar particles) was not found in the ceramic layer. The sample thus obtained is presented to the evaluation of the characteristics that will be described later.

With each sample of the above described embodiment 16 to 17 and comparative example 6, repetitive heat test was respectively carried out between under a condition of a stress of 250 MPa and in the air atmosphere of 1123 K which simulates the atmosphere to which the member is exposed during gas turbine operation, and under a condition of the room temperature, with 12 hours cycle time.

As the results, the sample of embodiment 16 to 17 did not show any peeling of the ceramic layer even after 1000 cycles. When the cross section of the sample was observed after the test, in the Y stabilized $ZrO_2$ layer, a little growth of the crack was found in some portion, but it is found that the development of the cracks was suppressed by the dispersion particles such as planar particles. On the contrary, in the ceramic layer of the sample of comparative example 6, zirconia layer began to peel off at 700 cycles, and completely peeled off at 800 cycles.

Embodiment 18

On a surface of a round bar consisting of a Ni based super heat resistant alloy CMSX-2, a NiCoCrAlY alloy layer of a thickness of about 140 μm is formed with the plasma spraying. Subsequently, with a powder mixture, in which to a mixture (particle diameter distribution: 20 to 80 μm) of 8% by weight $Y_2O_3$ stabilized $ZrO_2$ and 8% by weight MgO stabilized $ZrO_2$ mixed with a ratio of 10:2, 25% by weight of $Nb_2O_5$ powder is mixed, as a spray raw material powder, a ceramic layer of a thickness of 250 μm is formed to cover.

Next, a sample on which the ceramic layer is formed is heat treated under a condition of 1473 K and 3 hours, subsequently under a condition of 1073 K and 16 hours. When examined the constituent material of the ceramic layer after the heat treatment with XRD, it is found to be mainly constituted of Y stabilized $ZrO_2$, monoclinic $ZrO_2$ and $MgNb_2O_6$. Further, when observed with SEM, between Y stabilized zirconia spray particles and monoclinic zirconia spray particles mainly constituting the ceramic layer, planar particles consisting of $MgNb_2O_6$ were confirmed to exist in a coagulated manner. Their coagulated diameter was about 20 to 30 μm. The sample thus obtained is presented to the evaluation of the characteristics that will be described later.

Comparative Example 7

On a surface of a round bar consisting of a Ni based super heat resistant alloy CMSX-2, a NiCoCrAlY alloy layer of a thickness of about 140 μm is formed with the plasma spraying. Subsequently, with a powder mixture in which 8% by weight $Y_2O_3$ stabilized $ZrO_2$ and 8% by weight MgO stabilized $ZrO_2$ are mixed with a ratio of 10:2, as a spray raw material powder, a ceramic layer of a thickness of 200 μm is formed to cover.

Next, a sample on which the ceramic layer is formed is heat treated under a condition of 1473 K and 3 hours, subsequently under a condition of 1073 K and 16 hours. When examined the constituent material of the ceramic layer after the heat treatment with XRD, it is found to be mainly constituted of Y stabilized $ZrO_2$ and monoclinic $ZrO_2$. Further, when observed with SEM, any precipitation layer could not be found. The sample thus obtained is presented to the evaluation of the characteristics that will be described later.

With each sample of the above described embodiment 18 and comparative example 7, repetitive heat test was respectively carried out between under a condition of a stress of 250 MPa and in the air atmosphere of 1123 K which simulates the atmosphere to which the member is exposed during gas turbine operation, and under a condition of the room temperature, with 12 hours cycle time.

As the results, the sample of embodiment 18 did not show any peeling of the ceramic layer even after 1000 cycles. When the cross section of the sample was observed after the test, in the Y stabilized $ZrO_2$ layer, a little growth of the crack was found in some portion, but it is found that the development of the cracks was suppressed by the dispersion particles such as planar particles or acicular particles. On the contrary, in the sample of comparative example 7, the ceramic layer peeled off in a short time of heat cycles.

What is claimed is:

1. A ceramic composite material, comprising:
   a ceramic material constituting a matrix; and
   dispersion particles disposed in a dispersing manner in the matrix, and consisting of a composite oxide including at least a first metallic element selected from the group consisting of alkaline earth metals and at least a second metallic element selected from the group consisting of W, Ti, Ta, Mo, Nb, V, B, Te, Ge and Si,
   wherein the dispersion particles include acicular particles of the composite oxide incorporated inside crystal grains of the ceramic material, and
   wherein the ceramic composite material is produced by a method comprising:
      a forming step of forming a mixed powder by mixing a first powder containing the ceramic material and one of the selected first metallic element and the selected second metallic element, and a second powder containing the remaining selected metallic element; and
      a heat treating step of heat treating to precipitate the dispersion particles.

2. The ceramic composite material as set forth in claim 1;
   wherein, the matrix is consisting of an oxide based ceramic material.

3. The ceramic composite material as set forth in claim 2;
   wherein, the oxide based ceramic material includes a stabilized zirconia.

4. The ceramic composite material as set forth in claim 1;
   wherein, the dispersion particles comprise coagulated particles of the acicular particles.

5. The ceramic composite material as set forth in claim 1;
   wherein, the dispersion particles are contained in the range of 1 to 50% by weight to the matrix.

6. The ceramic composite material as set forth in claim 1;
   wherein, the first metallic element includes at least one element selected from the group consisting of Mg and Ca.

7. The ceramic composite material as set forth in claim 1;
   wherein, the second metallic element includes at least one element selected from the group consisting of W, Ti, Ta, Mo and Nb.

8. A heat resistant member comprising:
   a metal basis consisting of an alloy of which a main component is at least one element selected from the group consisting of Ni, Co and Fe; and
   a ceramic layer formed to cover on the metal basis, directly or through a metallic bonding layer, wherein, the ceramic layer comprises a ceramic material constituting a matrix, and dispersion particles disposed in the matrix in a dispersion manner and consisting of a composite oxide including at least a first metallic element selected from the group consisting of alkaline earth metals and at least a second metallic element selected from the group consisting of W, Ti, Ta, Nb, Mo, V, B, Te, Ge and Si;
   wherein the dispersion particles include acicular particles of the composite oxide incorporated inside crystal grains of the ceramic material, and
   wherein the ceramic composite material is produced by a method comprising:
      a forming step of forming a mixed powder by mixing a first powder containing the ceramic material and one of the selected first metallic element and the selected second metallic element, and a second powder containing the remaining selected metallic element; and
      a heat treating step of heat treating to precipitate the dispersion particles.

9. The heat resistant member as set forth in claim 8:
   wherein, the ceramic material constituting a matrix of the ceramic layer includes a stabilized zirconia.

10. The heat resistant member as set forth in claim 8:
    wherein, the ceramic layer is a thermally sprayed layer of the ceramic material.

11. The heat resistant member as set forth in claim 8:
    wherein, the dispersion particles comprise coagulated particles of the acicular particles.

12. The heat resistant member as set forth in claim 8:
    wherein, the metal bonding layer is constituted of an M—Cr—Al—Y alloy, M denoting at least one element selected from the group consisting of Ni, Co and Fe.

13. The ceramic composite material as set forth in claim 1;
    wherein, in the heat treating step, the heat treatment is carried out in the temperature range of 773 to 1673° K.

14. The ceramic composite material as set forth in claim 1;
    wherein, the producing method further comprising:
       a step of, following the heat treating step, sintering the ceramic composite material.

15. The ceramic composite material as set forth in claim 1;
    wherein, the mixed powder is formed in a layer through application of thermal spraying.

16. The ceramic composite material as set forth in claim 1;
    wherein, the mixed powder contains powder of the ceramic material, oxide powder of the first metallic element, and oxide powder of the second metallic element.

17. The ceramic composite material as set forth in claim 1;
    wherein, the mixed powder contains powder of the ceramic material, and powder of a composite oxide between the oxide of the first metallic element and the oxide of the second metallic element.

18. A ceramic composite material comprising:
    a ceramic material constituting a matrix; and
    dispersion particles disposed in a dispersed manner in the matrix, and consisting of a composite oxide including at least a first metallic element selected from the group consisting of alkaline earth metals and at least a second metallic element selected from the group consisting of W, Ti, Ta, Mo, Nb, V, B, Te, Ge and Si, wherein the dispersion particles include acicular particles of the composite oxide incorporated inside crystal grains of the ceramic material and acicular particles of the composite oxide at a grain boundary of the ceramic material, and wherein the ceramic composite material is produced by a method comprising:
 a forming step of forming a mixed powder by mixing a first powder containing the ceramic material and one of the selected first metallic element and the selected second metallic element, and a second powder containing the remaining selected metallic element; and
 a heat treating step of heat treating to precipitate the dispersion particles.

* * * * *